(12) United States Patent
Yu et al.

(10) Patent No.: US 11,781,548 B2
(45) Date of Patent: Oct. 10, 2023

(54) OIL SEPARATION APPARATUS AND HORIZONTAL COMPRESSOR

(71) Applicant: Emerson Climate Technologies (Suzhou) Co., Ltd., Jiangsu (CN)

(72) Inventors: Yinglin Yu, Suzhou (CN); Yong Luo, Suzhou (CN); Yu Fei, Suzhou (CN); Yonghua Cui, Suzhou (CN)

(73) Assignee: Emerson Climate Technologies (Suzhou) Co., Ltd., Jiangsu (CN)

( * ) Notice: Subject to any disclaimer, the term of this patent is extended or adjusted under 35 U.S.C. 154(b) by 508 days.

(21) Appl. No.: 16/635,117

(22) PCT Filed: Jul. 19, 2018

(86) PCT No.: PCT/CN2018/096242
§ 371 (c)(1),
(2) Date: Jan. 29, 2020

(87) PCT Pub. No.: WO2019/024686
PCT Pub. Date: Feb. 7, 2019

(65) Prior Publication Data
US 2020/0240413 A1    Jul. 30, 2020

(30) Foreign Application Priority Data

Aug. 3, 2017  (CN) .......................... 201710656325.9
Aug. 3, 2017  (CN) .......................... 201720963316.X (51) Int. Cl.
*F04C 29/02* (2006.01)
*F04C 18/02* (2006.01)
(Continued)

(52) U.S. Cl.
CPC ............ *F04C 29/026* (2013.01); *B01D 29/13* (2013.01); *B01D 39/10* (2013.01);
(Continued)

(58) Field of Classification Search
CPC .... F04C 29/026; F04C 18/0215; F04C 29/00; F04C 29/023; F04C 29/028; F04C 23/008;
(Continued)

(56) References Cited

U.S. PATENT DOCUMENTS 3,272,336 A * 9/1966 Humbert, Jr. ........ B01D 35/306
                                                210/DIG. 17
3,386,230 A * 6/1968 Riesberg ................ B01D 50/20
                                                55/498

(Continued)

FOREIGN PATENT DOCUMENTS

CN    101292088 A    10/2008
CN    102072158 A    5/2011
(Continued)

OTHER PUBLICATIONS

Extended European Search Report regarding Application No. EP18842271 dated Nov. 9, 2020.

(Continued)

*Primary Examiner* — Robert A Hopkins
*Assistant Examiner* — Qianping He
(74) *Attorney, Agent, or Firm* — Harness, Dickey & Pierce, P.L.C.

(57) ABSTRACT

Disclosed are an oil separation apparatus (70) and a horizontal vortex compressor (1) comprising the oil separation apparatus (70). The oil separation apparatus (1) comprises a support (71) and a filter member (72), wherein the support (71) is generally cylindrical and comprises a cylindrical wall (712), the filter member (72) is arranged on the cylindrical wall (712), and the cylindrical wall (712) is provided with an opening (711, 713) used for working fluid to pass through; and the filter member (72) is generally cylindrical, and comprises an inner and an outer holding member (74, 76)

(Continued)

holding inner and outer contours of the filter member (72) and end holding members (75a, 75b) provided on axial ends of the filter member (72). The oil separation apparatus (70) can increase the oil level of lubricating oil in the compressor (1), reducing disturbance in an oil tank and reducing oil circulation efficiency.

13 Claims, 5 Drawing Sheets (51) Int. Cl.
*B01D 39/10* (2006.01)
*B01D 29/13* (2006.01)
*B01D 46/00* (2022.01)
*B01D 46/24* (2006.01)

(52) U.S. Cl.
CPC ......... *B01D 46/0005* (2013.01); *B01D 46/24* (2013.01); *F04C 18/0215* (2013.01); *B01D 2201/0415* (2013.01); *B01D 2201/0461* (2013.01); *B01D 2201/20* (2013.01); *B01D 2265/06* (2013.01)

(58) Field of Classification Search
CPC .... B01D 29/13; B01D 39/10; B01D 46/0005; B01D 46/24; B01D 2201/0415; B01D 2201/0461; B01D 2201/20; B01D 2265/06; B01D 46/0004; B01D 46/2414; B01D 2259/4575; B64D 37/32; F01C 18/0215

USPC ...... 55/492; 184/6.16; 418/88, 417, 94, 102; 417/410.5

See application file for complete search history.

(56) References Cited

U.S. PATENT DOCUMENTS

| | | | |
|---|---|---|---|
| 4,477,233 | A | 10/1984 | Schaefer |
| 5,318,411 | A | 6/1994 | Heinrichs et al. |
| 7,566,210 | B2 | 7/2009 | Elson et al. |
| 2007/0092391 | A1 | 4/2007 | Elson et al. |
| 2009/0235506 | A1* | 9/2009 | Castricum ............. B01D 29/111 |
| | | | 72/367.1 |
| 2011/0085925 | A1 | 4/2011 | Fan et al. |
| 2014/0162346 | A1* | 6/2014 | Mitchell ............ B01D 46/0036 |
| | | | 96/138 |

FOREIGN PATENT DOCUMENTS

| | | | |
|---|---|---|---|
| CN | 205516984 U | * | 8/2016 |
| CN | 206221276 U | | 6/2017 |
| CN | 207470441 U | | 6/2018 |
| DE | 102014118266 B3 | | 6/2016 |
| JP | 2000130368 A | | 5/2000 |
| KR | 20120062415 A | | 6/2012 |

OTHER PUBLICATIONS

International Search Report for PCT/CN2018/096242 (in Chinese and English), dated Oct. 12, 2018; ISA/CN.

* cited by examiner

OIL SEPARATION APPARATUS AND HORIZONTAL COMPRESSOR

This application is the national phase of International Application No. PCT/CN2018/096242 titled "OIL SEPARATION APPARATUS AND HORIZONTAL COMPRESSOR" and filed on Jul. 19, 2018, which claims the priorities to Chinese Patent Applications No. 201710656325.9 and No. 201720963316.X titled "OIL SEPARATION APPARATUS AND HORIZONTAL COMPRESSOR" and filed with the Chinese Patent Office on Aug. 3, 2017, the entire disclosures of which are incorporated herein by reference.

FIELD

The present application relates to an oil separation apparatus and a horizontal compressor having the oil separation apparatus.

BACKGROUND

A compressor generally includes a shell, a compression mechanism accommodated in the shell, a rotating shaft for driving the compression mechanism, a motor that provides power to rotate the rotating shaft, and the like. Movable components of the compressor (for example, an orbiting scroll of a scroll compressor, a rotor of a rotor compressor, a bearing, etc.) require to be lubricated by lubricating oil to maintain the stability and reliability of operation of the movable components and the entire compressor. Therefore, the compressor's lubricating oil circulation system is an important part of the compressor.

When the compressor is running, the lubricating oil is delivered from an oil sump to the movable components of the compressor, for example, under the effect of differential pressure or by an oil pumping mechanism to lubricate the components, thereby maintaining the normal operation of the movable components, and finally returned to the oil sump. In addition, during circulation of the lubricating oil, it may take away foreign matters between contact surfaces of the components to reduce wear, and take away heat of the components caused by friction or current.

During circulation of the lubricating oil, some lubricating oil may leave the compressor along with the working fluid. In this way, after the compressor has been in operation for a period of time, the amount of lubricating oil in the oil sump gradually decreases, that is, the oil level is lowered, resulting in an insufficient amount of lubricating oil for maintaining normal operation of the movable components and thus abnormal operation of the compressor. Therefore, it is significant to maintain the oil level of the oil sump in the compressor at a normal level. Also, the lubricating oil discharged from the compressor along with the working fluid may adhere to, for example, coils of a condenser and an evaporator, which adversely affects the heat exchange efficiency of the working fluid with the ambient air. Therefore, it is necessary for the compressor to properly control its lubricating oil circulation rate (also referred to as oil circulation rate). Here, the oil circulation rate can be understood as the (mass) ratio of the lubricating oil contained in unit working fluid discharged from the compressor.

Therefore, there is always room for improvement in the oil circulation rate in the art.

SUMMARY

An aspect of the present application is to provide an oil separation apparatus by which lubricating oil circulation rate can be reasonably controlled and sufficient oil level can be ensured.

Another aspect of the present application is to provide an oil separation apparatus capable of efficiently separating lubricating oil from compressed working fluid.

Another aspect of the present application is to provide an oil separation apparatus that is easily manufactured and assembled.

Another aspect of the present application is to provide a horizontal compressor including the above-mentioned oil separation apparatus.

According to an aspect of the present application, an oil separation apparatus is provided, which includes a bracket and a filter. The bracket is provided with an opening. The filter is fitted on an outer side of the bracket and covers the opening. In the oil separation apparatus according to the present application, since the bracket is arranged on an inner side of the filter, the oil level of the lubricating oil is allowed to be raised, the disturbance to the oil sump can be reduced, and the oil circulation rate can be reduced.

In some embodiments of the present application, the bracket is divided into a first half and a second half by an imaginary plane passing through a central axis of the bracket, and the opening is provided in the first half, and the second half is solid.

In some embodiments of the present application, the first half is provided with two openings arranged symmetrically.

In some embodiments of the present application, the bracket includes a cylindrical wall, and the filter is arranged on the cylindrical wall.

In some embodiments of the present application, the bracket further includes an end wall arranged at an end of the cylindrical wall, and the end wall is an annular wall or a circular wall closing the end of the cylindrical wall which extends radially inward from the cylindrical wall.

In some embodiments of the present application, the filter has a cylindrical shape.

In some embodiments of the present application, the oil separation apparatus further includes an inner holding member arranged on an inner side of the filter and configured to hold the filter and/or an outer holding member arranged on an outer side of the filter and configured to hold the filter.

Preferably, the inner holding member is a coil spring and/or the outer holding member is a coil spring.

In some embodiments of the present application, the oil separation apparatus further includes an end holding member arranged at at least one of the ends of the filter.

Optionally, the filter is a metal filter screen.

In some embodiments of the present application, the two openings are spaced apart by a separation rib.

According to another aspect of the present application, a horizontal compressor is provided, which includes a shell, a compression mechanism, and the oil separation apparatus described above. The shell includes an end cap. The compression mechanism is accommodated in the shell and is configured to compress a working fluid. The oil separation apparatus is arranged at a discharge port of the compression mechanism.

In some embodiments of the present application, the oil separation apparatus is fixed to the end cap, and the oil separation apparatus has a longitudinal axis substantially parallel to a longitudinal axis of the horizontal scroll compressor.

In some embodiments of the present application, the horizontal scroll compressor further includes a partition configured to divide the space in the shell into a high-pressure side space and a low-pressure side space, and the oil separation apparatus is arranged between the end cap and the partition.

In some embodiments of the present application, the opening of the oil separation apparatus is located above an imaginary horizontal plane passing through the central axis of the bracket.

BRIEF DESCRIPTION OF THE DRAWINGS

The features and advantages of the present application will become more readily understood from the following description with reference to the accompanying drawings. These drawings are exemplary only and are not drawn to scale. In the drawings.

DETAILED DESCRIPTION

The following description of the preferred embodiments is merely exemplary, and is in no way a limitation to the present application and its application or usage. The directional terms used in this document, such as "horizontal direction" and "vertical direction" are made reference to the orientation shown in the drawings.

An oil separation apparatus and a compressor including the oil separation apparatus according to embodiments of the present application will be described below with reference to the drawings. A low side horizontal scroll compressor is shown in the drawings, however, it should be understood that the present application is also applicable to other types of compressors, such as a vertical scroll compressor, a high side scroll compressor, a rotor compressor, a piston compressor, etc.

Figure 1:
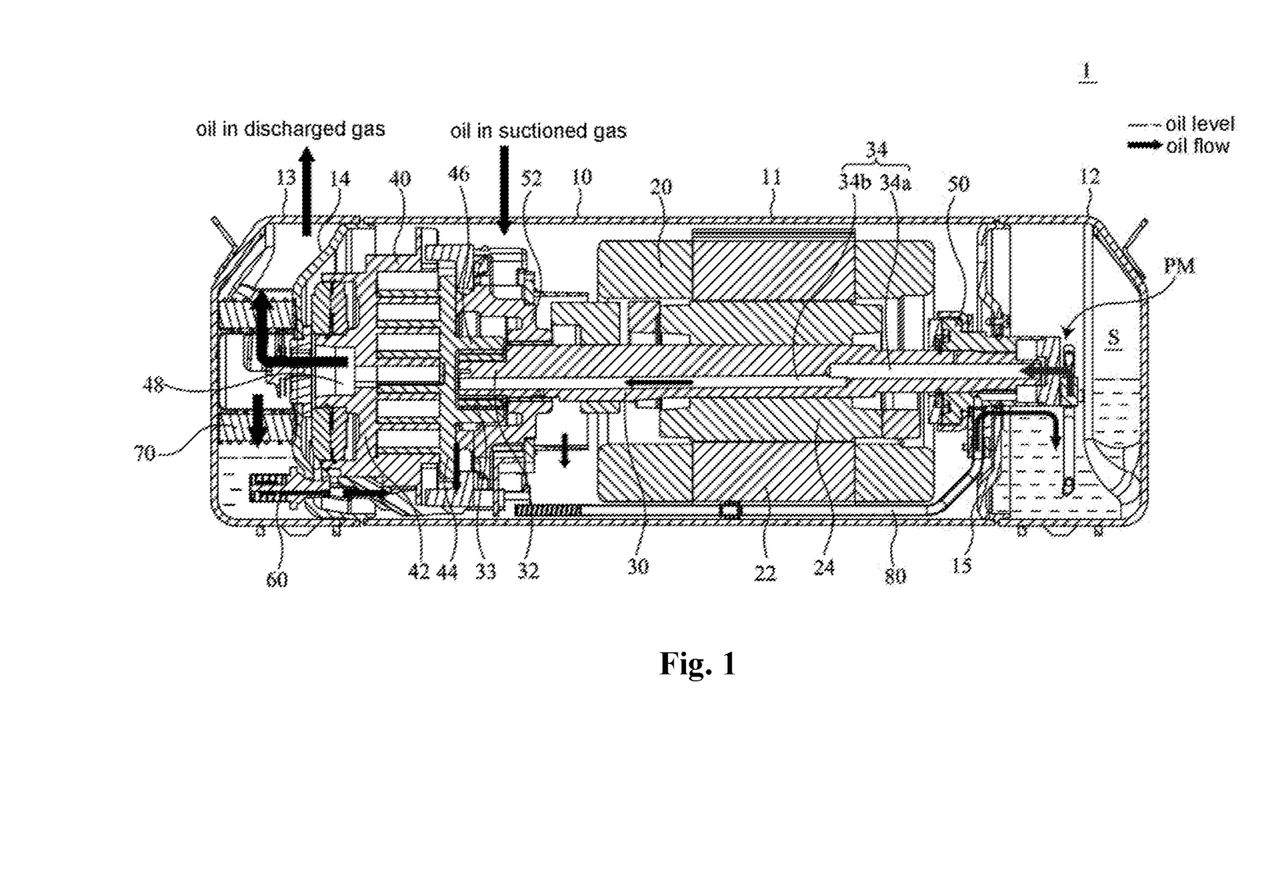
FIG. 1 is a longitudinal sectional view of a compressor according to an embodiment of the present application.
Figure 2:
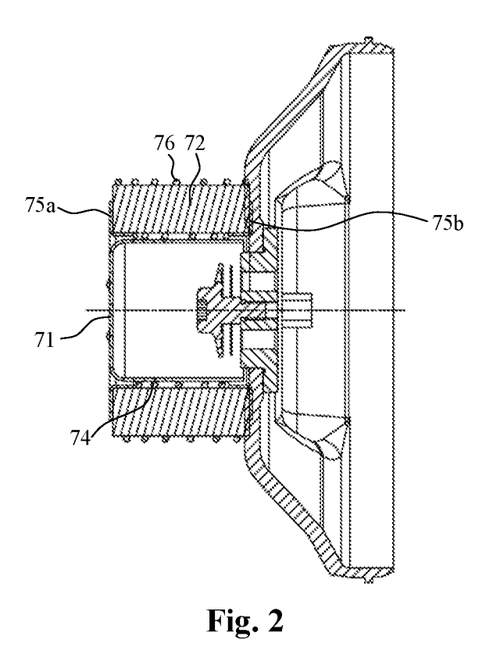
FIG. 2 is a partially enlarged schematic view of the compressor in FIG. 1 including an oil separation apparatus.

Hereinafter, the horizontal scroll compressor according to an embodiment of the present application will be described with reference to FIG. 1. FIG. 1 is a longitudinal sectional view of an exemplary horizontal scroll compressor 1 in which the compressor's lubricating oil circulation is indicated by arrows.

As shown in the figure, the horizontal scroll compressor 1 includes a shell 10, and a motor 20, a rotating shaft 30 and a compression mechanism 40 which are accommodated in the shell 10. The motor 20 drives the compression mechanism 40 via the rotating shaft 30 to compress a working fluid (for example, a refrigerant).

The shell 10 has substantially a closed cylindrical shape. The shell 10 may include a main body 11, and a first end cap 12 and a second end cap 13 which are fixed to both axial ends of the main body 11 respectively. The main body 11 is equipped with a suction port (not shown) configured to suction refrigerant, and the second end cap 13 is equipped with a discharge port (not shown) configured to discharge compressed high-pressure refrigerant. A partition 14 extending substantially transversely to the main body 11 is further provided between the main body 11 and the second end cap 13 so as to divide the internal space of the compressor shell 10 into a high-pressure side space and a low-pressure side space. Specifically, the high-pressure side space is defined by the second end cap 13 and the partition 14, and the low-pressure side space is defined by the partition 14, the main body 11 and the first end cap 12. The motor 20, the rotating shaft 30 and the compression mechanism 40 are located in the low-pressure side space. This compressor is also referred to as a low side compressor.

The motor 20 includes a stator 22 fixed to the shell 10 and a rotor 24 fixed to the rotating shaft 30. While the motor 20 is started, the rotor 24 rotates relative to the stator 22 and drives the rotating shaft 30 to rotate.

A first end (a right end in the figure) of the rotating shaft 30 can be supported by a first bearing housing 50 via a first bearing, and a second end (a left end in the figure) of the rotating shaft 30 can be supported by a second bearing housing 52 via a second bearing. The rotating shaft 30 further includes an eccentric crank pin 32 arranged at the second end and configured to drive the compression mechanism. The rotating shaft 30 of the horizontal scroll compressor 1 extends substantially horizontally. That is, the longitudinal direction of the horizontal scroll compressor 1 is substantially parallel to the horizontal direction.

The compression mechanism 40 includes a non-orbiting scroll component 42 and an orbiting scroll component 44 that are engaged with each other. Each of the non-orbiting scroll component 42 and the orbiting scroll component 44 includes an end plate and spiral vanes extending from one side of the end plate. A series of compression chambers progressively decreasing from a radially outer side to a radially inner side are formed between the spiral vanes of the non-orbiting scroll component 42 and the orbiting scroll component 44. The eccentric crank pin 32 of the rotating shaft 30 is inserted into a hub 46 of the orbiting scroll component 44 via a bush 33 to rotatably drive the orbiting scroll component 44, so that the orbiting scroll component 44 orbits the non-orbiting scroll component 42 (i.e., the central axis of the orbiting scroll component moves around the central axis of the non-orbiting scroll component, but the orbiting scroll component itself does not rotate around its own central axis), to compress the refrigerant suctioned into the compression chamber of the compression mechanism 40. The compressed refrigerant is discharged into the high-pressure side space through a discharge port 48 of the compression mechanism.

A lubricating oil supply system is further provided in the compressor to supply lubricating oil to movable components to lubricate the movable components. In addition to providing lubrication to relevant components of the compressor, the lubricating oil can also provide cooling and cleaning functions. Therefore, the design and configuration of the lubricating oil circuit are significant for ensuring the lubrication and efficient and stable operation of the compressor in the design of the horizontal scroll compressor.

As part of the lubricating oil supply system, or as an example of the lubricating oil supply system, a lubricating oil passage 34 is provided in the rotating shaft 30. The lubricating oil passage 34 may include a concentric hole 34a at a first end of the rotating shaft 30 and an eccentric hole 34b in communication with the concentric hole 34a and extending toward the second end of the rotating shaft 30. In the illustrated example, the eccentric hole 34b extends through the eccentric crank pin 32 of the rotating shaft 30 to an end face of the second end. The eccentric hole 34b offsets from the concentric hole 34a radially and offsets from the rotation axis of the rotating shaft 30.

An oil supply device (for example, an intermittent supply device) or an oil pumping mechanism PM may be provided at the first end of the rotating shaft 30. In the example in FIG. 1, a vertical separator (also used as a support member for the first bearing housing 50) 15 is utilized to create a separate oil sump S, which is helpful for monitoring and controlling the oil level in the oil sump S to be always at an oil level allowing normal operation of the compressor. However, it may be appreciated by the person skilled in the art that the present application is not limited thereto. For example, the oil sump S may also be formed by using a double layered shell or a separate chamber structure or in any other suitable form.

As shown in the figure, the lubricating oil in the oil sump is pumped to the concentric hole 34a by the oil pumping mechanism PM. When the rotating shaft 30 rotates, the lubricating oil travels along the eccentric hole 34b toward the second end under the centrifugal force. As the lubricating oil travels along the lubricating oil passage 34, the lubricating oil may flow out through radial holes provided in the rotating shaft 30 to lubricate key components of the compressor such as the bearings. The lubricating oil travels to the second end of the rotating shaft 30, and exits from the eccentric crank pin 32 of the rotating shaft 30 and enters a recess of the second bearing housing 52, whereby the bush 33 can be lubricated. One part of the lubricating oil flows along an outer peripheral surface of the rotating shaft 30 to lubricate the second bearing and the like, and then drops to the bottom of the shell. Another part of the lubricating oil may travel to an area between bearing surfaces of the second bearing housing 52 and the orbiting scroll component 44, and the oil mist formed thereby enters the compression mechanism or drips to the bottom of the shell.

The lubricating oil entered the compression mechanism, together with the compressed gas, is discharged into the high-pressure side space through the discharge port of the compression mechanism. The mixture of lubricating oil and compressed gas flows through an oil separation apparatus 70, such that most of the lubricating oil is separated and accumulated at the bottom of the shell in the high-pressure side space, and a small part of the lubricating oil is discharged out of the compressor along with the compressed gas.

The lubricating oil exiting from the compressor 1 may pass through an external refrigerant circulation circuit along with the working fluid and return to the compressor 1 through the suction port again. The lubricating oil accumulated at the bottom of the shell is returned to the oil sump S through an oil supply line (for example, a capillary 60, a duct 80) or directly returned to the lubricating oil passage 34 of the rotating shaft 30 under the differential pressure or by means of a guide device. In this way, the lubricating oil inside the compressor is circulated.

During the operation of the compressor, the lubricating oil supplied from the lubricating oil passage of the rotating shaft may be distributed inside the compressor shell in the form of oil mist caused by movements of the rotating shaft, movable scroll component, motor rotor and other components, and is compressed by the compression mechanism and then discharged to the high-pressure side space. Therefore, the high-pressure working fluid (high-pressure refrigerant) discharged from the discharge port in the compressor shell generally contains lubricating oil. If the amount of the lubricating oil discharged from the compressor along with the high-pressure working fluid is large, in one aspect, the oil level in the oil sump in the compressor drops, resulting in an insufficient amount of lubricating oil for maintaining normal operation of the compressor; in another aspect, the lubricating oil discharged may adhere to, for example, coils of a condenser and an evaporator, which adversely affects the efficiency of heat exchange between the working fluid and the ambient air. Therefore, it is necessary for the compressor to properly control its lubricating oil circulation rate (also referred to as oil circulation rate).

The oil separation apparatus according to an embodiment of the present application will be described in detail hereinafter with reference to FIGS. 2 to 6. As shown, the oil separation apparatus 70 includes a bracket 71 and a filter 72. The filter 72 is fitted to the bracket 71 and is located outside of the bracket 71.

Figure 4:
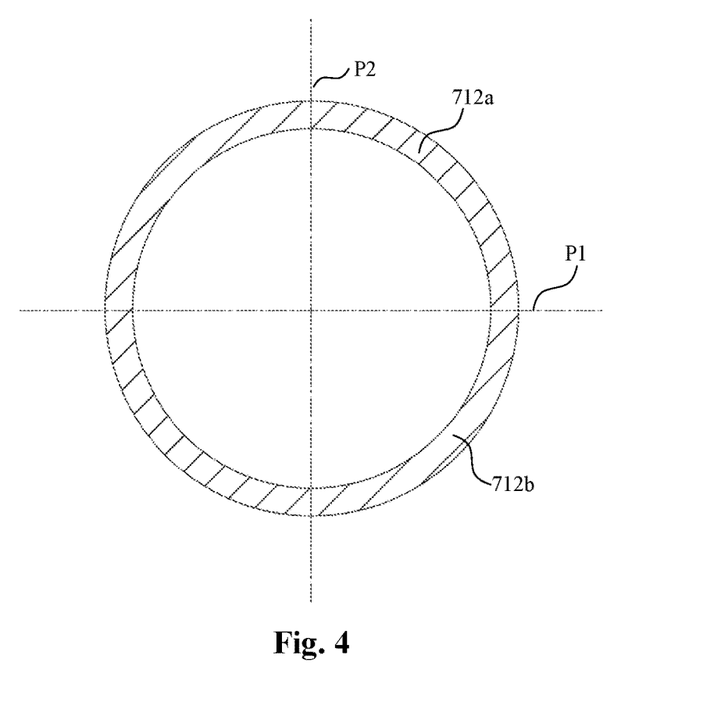
FIG. 4 is an end view of the bracket in FIG. 3.

In the example shown, the bracket 71 has substantially a cylindrical shape. The bracket 71 includes a cylindrical wall 712, and the filter 72 is arranged on the cylindrical wall 712. It should be understood that the shape of the wall 712 is not limited to the cylindrical shape, and may be, for example, a polygonal shape, an elliptical shape, or the like. The cylindrical wall 712 is provided with openings 711 and 713 for passage of the working fluid. The cylindrical wall 712 of the bracket 71 is divided into a first half 712a (an upper half in the illustrated example) and a second half 712b (a lower half in the illustrated example) by an imaginary plane P1 passing through the central axis of the bracket 71 (a horizontal plane in the illustrated example, as shown in FIG. 4). The openings 711 and 713 are provided in the first half 712a. The second half 712b is void of openings or gaps, but is a solid portion extending continuously. In the case where the level of oil stored in the high-pressure side oil sump is not required to be high, the openings 711 and 713 provided in the first half 712a may also partially extend to the second half 712b, or openings may be provided in both the first half 712a and the second half 712b to provide a larger filtration and flow area.

Figure 6:
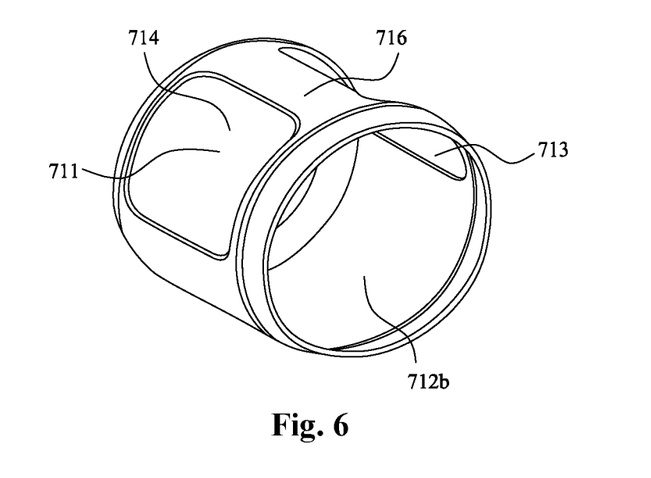
FIG. 6 is a schematic perspective view of the bracket in FIG. 3.

In the illustrated example, the two openings 711 and 713 are symmetrically provided in the first half 712a, and the opening 711 and the opening 713 are spaced apart by a separation rib 716 (as shown in FIG. 6). The separation rib 716 shown in FIG. 6 extends in a longitudinal direction of the bracket 71, so that the two openings 711 and 713 are arranged side by side in a circumferential direction, or are symmetrically arranged with respect to an imaginary vertical plane P2 passing through the central axis of the bracket 71 (as show in FIG. 4). However, in an alternative embodiment, the separation rib 716 may extend in the circumferential direction of the bracket 71, and openings are provided in the longitudinal direction (axial direction) of the bracket 71 at two sides of the separation rib 716, that is, the openings are provided side by side in the longitudinal direction of the bracket 71. The opening 711 and the opening 713 may have the same shape and size or may have different shapes and sizes. It should be understood that the number and structure of the openings are not limited to the illustrated examples, but may be varied depending on the situation of application. For example, the opening may be in the form of a grid. It is possible to provide only one opening if the structural strength of the bracket 71 can be ensured. Preferably, the size of the opening can be as large as possible if the structural strength of the bracket 71 can be ensured, to increase the inner flow area for the high-pressure working fluid, thereby improving oil separation efficiency.

Figure 3:
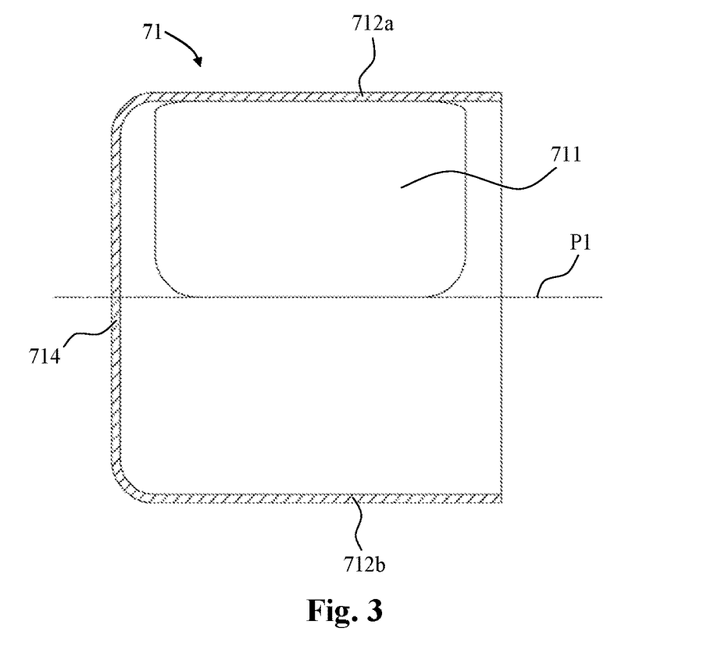
FIG. 3 is a schematic view of a bracket of the oil separation apparatus according to an embodiment of the present application.

Optionally, the bracket 71 may further include an end wall 714 arranged at one end of the cylindrical wall 712. The end wall 714 may be an annular wall with a circular hole at the center or may be a closed circular wall. In the illustrated example, the end wall 714 of the bracket 71 may be fixed to the second end cap 13 of the compressor by means of welding or bonding or the like, for example. In an alternative embodiment, the bracket 71 may be provided with any suitable mounting features (e.g., a flange, a mounting hole, a boss) for mounting the bracket 71 to a stationary structure (e.g., the shell, a stationary component of the compressor).

Figure 5:
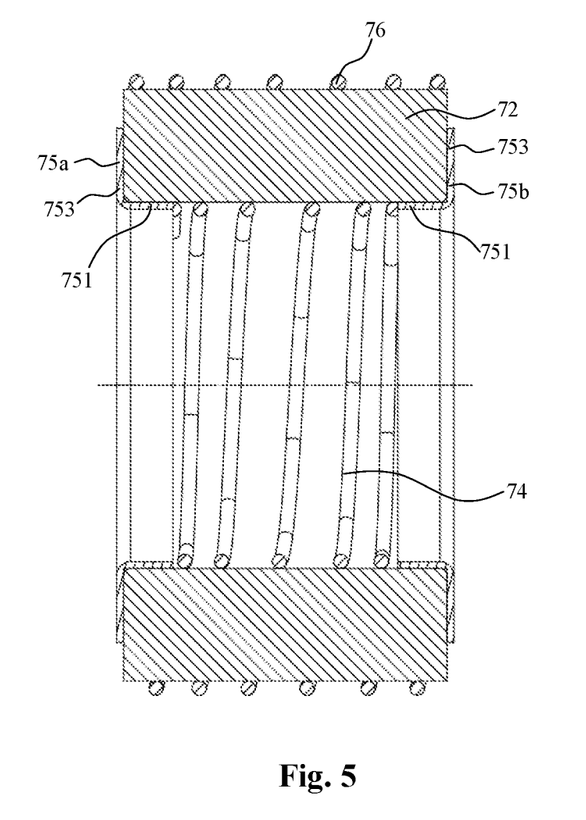
FIG. 5 is a schematic view of an oil separation component of the oil separation apparatus according to an embodiment of the present application.

In the illustrated example, the filter 72 has substantially a cylindrical shape. It should be understood that the shape of the filter 72 is not limited to the cylindrical shape, and may be, for example, a polygonal shape, an elliptical shape, or the like. The filter 72 may be shaped and/or sized to match the bracket 71, in particular the wall 712. The filter 72 may be made of any appropriate material suitable for separating the lubricant from the working fluid. For example, the filter 72 may be formed of a metal filter screen. Considering that the filter 72 may undergo elastic deformation to some extent, the filter 72 may have a length greater than the length of the wall 712.

It should be understood that, depending on the situation of application, the filter 72 can be held or fixed to the bracket 71, or slidably mounted on the bracket 71. In an alternative embodiment, the filter 72 may be formed integrally with the bracket 71.

In an embodiment of the present application, the oil separation apparatus 70 may further include an inner holding member 74 arranged on an inner side of the filter 72 and configured to hold an inner contour of the filter 72. The inner holding member 74 may be a coil spring. It should be understood that the inner holding member 74 may be any appropriate members capable of holding the filter and ensuring a sufficient inside flow area of the filter. Preferably, the inner holding member 74 is elastic to allow the length of the filter 72 to vary.

In an embodiment of the present application, the oil separation apparatus 70 may further include an outer holding member 76 arranged on an outer side of the filter 72 and configured to hold an outer contour of the filter 72. The outer holding member 76 may be a coil spring. It should be understood that the outer holding member 76 may be any appropriate member capable of holding the filter and ensuring a sufficient outside flow area of the filter. Preferably, the outer holding member 76 is elastic to allow the length of the filter 72 to vary.

In an embodiment of the present application, the oil separation apparatus 70 may further include an end holding member arranged at at least one of two axial ends of the filter 72. In the illustrated example, the oil separation apparatus 70 includes end holding members 75a and 75b arranged at the axial ends of the filter 72 respectively. The end holding members 75a and 75b each include a cylindrical portion 751 located on the inner side of the filter 72 and a flange portion 753 extending radially outward from the cylindrical portion 751. It should be understood that the end holding members 75a and 75b may have the same structure and size, or may have different structures and sizes. The inner holding member 74, the outer holding member 76 and/or the end holding members 75a and 75b may be formed integrally with the filter 72, or may be assembled with the filter 72 in advance, as shown in FIG. 5.

The oil separation apparatus 70 according to the present application may be installed at the discharge port 48 of the compression mechanism 40 of the compressor 1. As shown in FIG. 1, the oil separation apparatus 70 may be arranged between the second end cap 13 and the partition 14 or between the second end cap 13 and the non-orbiting scroll component 42 (in the case where no partition is presented). The oil separation apparatus 70 has a longitudinal axis (central axis) substantially parallel to a longitudinal axis (central axis) of the compressor 1. Optionally, the longitudinal axis (central axis) of the oil separation apparatus 70 may coincide with the central axis of the discharge port 48 of the compression mechanism 40.

Referring to the horizontal scroll compressor 1 in FIG. 1, before the second end cap 13 is assembled, the bracket 71 of the oil separation apparatus 70 may be fixed to the second end cap 13 by welding, for example, and then the filter 72 (or an assembly formed by assembling the inner holding member 74, the outer holding member 76 and/or the end holding members 75a and 75b, and the filter 72) is fitted to the bracket 71. In this way, the second end cap 13, with the oil separation apparatus 70, may be assembled to other parts of the compressor. The oil separation apparatus 70, and particularly its filter 72, may preferably abut against the partition 14. In the case where the compressor is not provided with the partition 14, the oil separation apparatus 70, particularly the filter 72 thereof, may directly abut against the non-orbiting scroll component. In order to allow the filter 72 to be closely arranged between the second end cap 13 and the partition 14, the bracket 71 of the oil separation apparatus 70 may abut against the partition 14 or be spaced apart from the partition 14 by a certain distance, for example, a few millimeters. It is also conceivable to fix the oil separation apparatus to a partition or a non-orbiting scroll component.

In the compressor 1 assembled with the oil separation apparatus 70, the lubricating oil can be separated from the high-pressure working fluid discharged from the compression mechanism before the high-pressure working fluid exits from the compressor, to satisfactorily control the circulation rate of the lubricating oil. In one aspect, the oil level in the oil sump of the compressor can be maintained at a desired level or at a level as high as possible. In another aspect, the amount of lubricating oil exiting from the compressor and entering the compressor system can be reduced, for example, the amount of lubricating oil entering the heat exchanger can be reduced, thereby improving the overall working efficiency of the compressor system.

Figure 7:
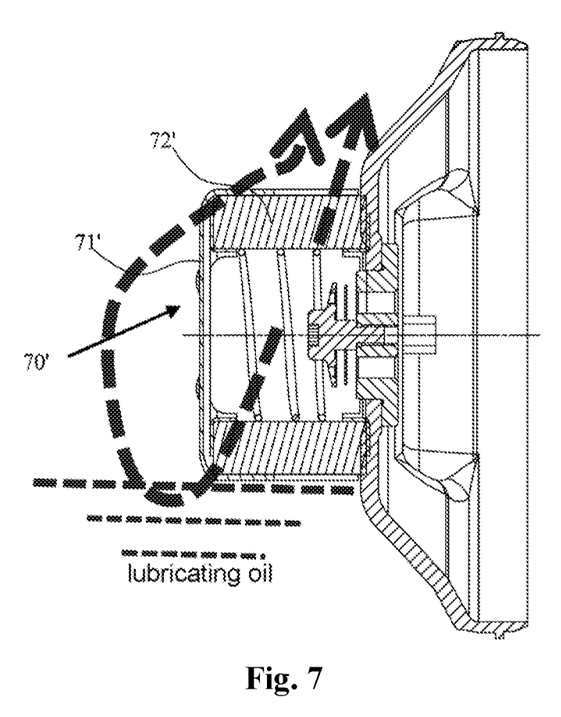
FIG. 7 is a schematic sectional view of an oil separation apparatus of a comparison example in which the oil separation apparatus is assembled to a partition.
Figure 8:
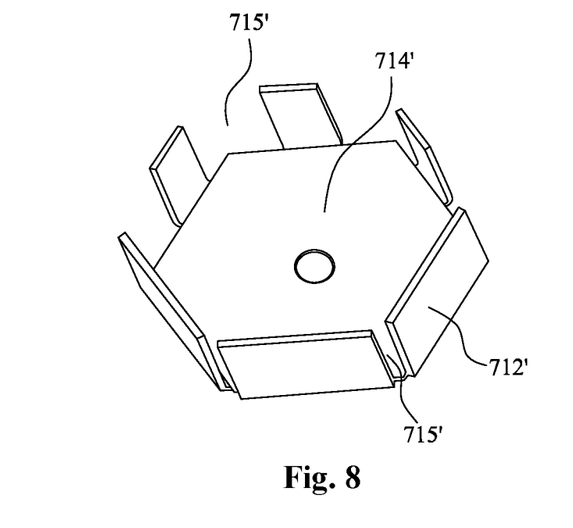
FIG. 8 is a schematic perspective view of a bracket of the oil separation apparatus of the comparison example in FIG. 7.

FIGS. 7 and 8 show an oil separation apparatus 70' of a comparison example. As shown, the oil separation apparatus 70' includes a bracket 71' and a filter 72' located on an inner side of the bracket 71'. The bracket 71' includes a polygonal end wall 714' and multiple axial walls 712' extending from an outer peripheral edge of the end wall 714'. A gap 715' is provided between adjacent axial walls 712' to allow the compressed high-pressure working fluid to flow out from the oil separation apparatus 70'.

In the comparison example shown in FIGS. 7 and 8, the bracket 71' is arranged on an outer side of the filter 72'. It is undesirable for the lubricating oil to immerse the bracket 71'. Therefore, the bracket 71' limits the maximum threshold of the oil level of the lubricating oil. Furthermore, due to the present of the gap 715', the high-pressure working fluid may disturb the lubricating oil when flowing out from the gap 715' near the lubricating oil, and may be discharged from the compressor with more lubricating oil, as indicated by the arrows in FIG. 7. The filter 72' is located on the inner side of the bracket 71', therefore, an inside flow area of the filter 72' is greater than an outside flow area thereof. With the structure of the oil separation apparatus shown in FIGS. 7 and 8, the high-pressure working fluid flows through the oil separation apparatus at a high speed, which is not conducive to separating the lubricating oil from the high-pressure working fluid.

In the oil separation apparatus according to the present application shown in FIGS. 1 to 6, the filter 72 is fitted on an outer side of the bracket 71. Therefore, the oil level of the lubricating oil is allowed to reach at least the vicinity of the bracket. In other words, the maximum threshold for the oil level can be increased. The increase in oil level is conducive to filling sufficient lubricating oil in a compressor before the compressor leaves the factory, and it is also conducive to returning a sufficient amount of lubricating oil to the oil sump S at the first end cap 12, thereby ensuring a stable and sufficient amount of lubricating oil in circulation.

In the oil separation apparatus according to the present application, the opening may be provided only in the first half 712a of the bracket 71, and the second half 712b may be solid without any openings provided. As shown in FIG. 1, in a state where the oil separation apparatus 70 is installed to the compressor, the first half 712a corresponds to the upper half in the vertical direction, and the second half 712b corresponds to the lower half in the vertical direction, therefore, the solid lower half allows to further increase the maximum threshold of the oil level. For the horizontal compressor employing the oil separation apparatus according to the present application, the maximum threshold of the oil level in the high-pressure side space can reach the central axis of the oil separation apparatus, or reach 40%, or even 50% of the vertical height of the horizontal compressor.

The openings 711 and 713 are provided in the upper half of the bracket 71, so that the high-pressure working fluid can be upwardly guided and discharged. In this way, the high-pressure working fluid may be prevented from disturbing the lubricating oil at the lower part of the oil separation apparatus, and the high-pressure working fluid may have a reduced flow speed so as to enable the lubricating oil to be fully separated from the high-pressure working fluid.

Since the filter 72 is fitted on the outer side of the bracket 71, the outside flow area of the filter is greater than the inside flow area thereof, which is more conducive to separating the lubricating oil from the high-pressure working fluid in the high-pressure side space and reducing the speed of the gas flow discharged from the oil separation apparatus, thus reducing the disturbance to the lubricating oil in the high-pressure side oil sump by gas flow, thereby further reducing the oil circulation rate.

Although various embodiments of the present application have been described in detail herein, it should be understood that the present application is not limited to the specific embodiments described and illustrated herein in detail, and other variations and modifications may be made by the person skilled in the art without departing from the substance and scope of the present application. All these variations and modifications fall within the scope of the present application. Moreover, all the components described here can be replaced by other technically equivalent components.

The invention claimed is:

1. An oil separation apparatus for separating lubricating oil from working fluid compressed in a horizontal compressor, comprising: a bracket, wherein the bracket is provided with at least one opening; and
   a filter, wherein the filter is fitted on an outer side of the bracket and covers the at least one opening,
wherein the bracket is divided by an imaginary plane passing through a central axis, which runs parallel to the filter, of the bracket into a first half and a second half, the least one opening is provided in the first half, and the second half consists essentially of solid body.

2. The oil separation apparatus according to claim 1, wherein the first half is provided with two openings arranged symmetrically.

3. The oil separation apparatus according to claim 1, wherein the bracket comprises a cylindrical wall, and the filter is arranged on the cylindrical wall.

4. The oil separation apparatus according to claim 3, wherein the bracket further comprises an end wall arranged at an end of the cylindrical wall, and the end wall is an annular wall or a circular wall closing the end of the cylindrical wall which extends radially inward from the cylindrical wall.

5. The oil separation apparatus according to claim 1, wherein the filter has a cylindrical shape.

6. The oil separation apparatus according to claim 5, wherein the oil separation apparatus further comprises:
   an inner holding member arranged on an inner side of the filter and configured to hold the filter; and/or
   an outer holding member arranged on an outer side of the filter and configured to hold the filter.

7. The oil separation apparatus according to claim 6, wherein the inner holding member is a coil spring and/or the outer holding member is a coil spring.

8. The oil separation apparatus according to claim 7, wherein the oil separation apparatus further comprises an end holding member arranged at at least one end of the filter.

9. The oil separation apparatus according to claim 1, wherein the filter is a metal filter screen.

10. The oil separation apparatus according to claim 2, wherein, the two openings are spaced apart by a separation rib.

11. A horizontal compressor, comprising:
   a shell, wherein the shell comprises an end cap;
   a compression mechanism, wherein the compression mechanism is accommodated in the shell and configured to compress a working fluid; and
   the oil separation apparatus according to claim 1, wherein the oil separation apparatus is arranged at a discharge port of the compression mechanism.

12. The horizontal compressor according to claim 11, wherein the oil separation apparatus is fixed to the end cap with its central axis being parallel to a longitudinal axis of the horizontal compressor.

13. The horizontal compressor according to claim 12, wherein the horizontal scroll compressor further comprises a partition configured to divide the space in the shell into a high-pressure side space and a low-pressure side space, and the oil separation apparatus is arranged between the end cap and the partition.

\* \* \* \* \*